M. W. Pond,

Harness,

No. 2,344. Reissued Aug. 28, 1866.

Witnesses:
H. S. Wilson
H. B. West

Inventor:
M. W. Pond
Henry E. Munsey

N. PETERS, PHOTO-LITHOGRAPHER, WASHINGTON, D. C.

UNITED STATES PATENT OFFICE.

MARTIN W. POND AND HENRY E. MUSSEY, OF ELYRIA, OHIO, ASSIGNORS TO MARTIN W. POND.

IMPROVED METALLIC SHIELD FOR BREAST-STRAPS.

Specification forming part of Letters Patent No. 44,113, dated September 6, 1864; Reissue No. 2,344, dated August 28, 1866.

*To all whom it may concern:*

Be it known that we, MARTIN W. POND and HENRY E. MUSSEY, of Elyria, in the county of Lorain and State of Ohio, have invented a new and useful Improvement in Metallic Slides for Breast-Straps; and we do hereby declare that the following is a full, clear, and exact description thereof, reference being had to the accompanying drawings, and to the letters of reference marked thereon, in which—

Figure 1:
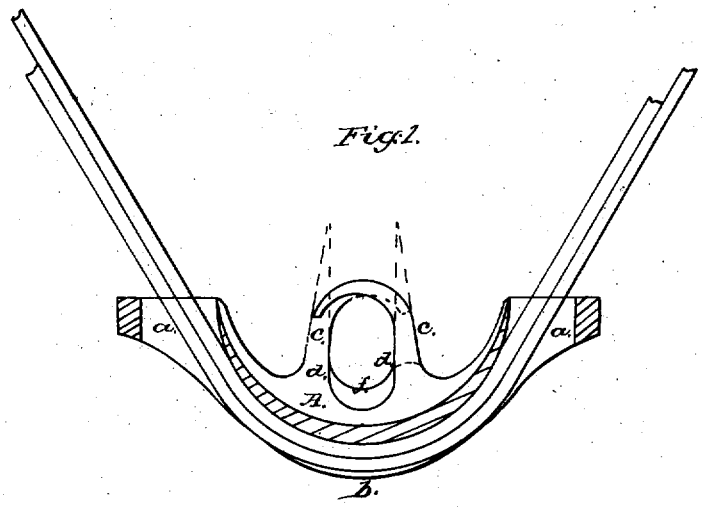
Figure 2:
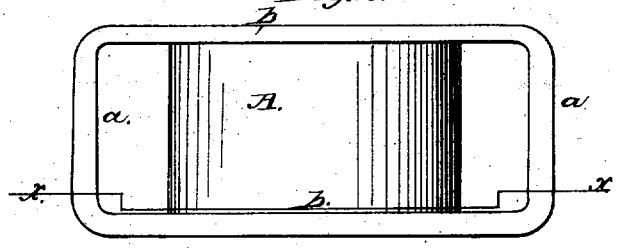

Figure 1 is a section taken in line *x x*. Fig. 2 is an inverted plane.

The nature of our invention consists in providing the breast-strap of a harness with a metallic shield, which is so constructed that the neck-yoke ring is secure in its seat and is there prevented from any lateral vibration, as will be more fully set forth in the following specification.

To enable others skilled in the arts to make and use our invention, we will proceed to describe its construction and operation.

A represents a curved metallic plate, on the ends of which loops *a a* are formed, through which the breast-strap passes. Said plate is provided with flanges *b b*, which are formed on its edges and serve to keep the strap in place. The lower surface of said plate is smooth.

*c c* are projecting horns which spring from the upper surface of said plate and are positioned on opposite sides of it. Their upper ends are curved so as to form a hook on each one. Said hooks are curved in opposite directions and lock past each other in such a manner that when the ring is placed in a diagonal position it will pass between the horns and readily fall into its seat at their base, in which case it assumes a transverse position, and it is impossible for it to become accidentally removed.

The base *d d* of the horns *c c* extend transversely and parallel across the upper surface of the plate and form the seat *f*. They are somewhat elevated, and the groove formed by them is just wide enough to admit the ring and is curved so as to just fill the curve of the ring. Thus when the ring is secured in position it is securely clamped or held firmly, so that there is no vibration or side motion if the ring is made to fit snugly. This is an important result, as when the slide is applied to practice the vibrations of the pole are at times very great, and unless the ring can be made in effect a part of the slide, so as to force said slide along on the strap by its leverage, it is sure to bend and cramp so as to almost destroy the effect of the slide. By obviating this we overcome all of the objections to my patent of 1864, wherein I obtained a claim on the use of the horns *c c*.

What we claim as new, and desire to secure by Letters Patent, is—

1. The seat *f* and base of horns *d d*, the same being constructed and operating in the manner and for the purposes substantially as specified.

2. The curved metallic slide having curved metallic horns, as described, in combination with the projections or base of horns forming the clamping-seat *f* of the shield, the whole being constructed in the manner and for the purpose described.

M. W. POND. [L. S.]
HENRY E. MUSSEY. [L. S.]

Witnesses:
H. F. WILLSON,
W. W. BUSHNELL.